F. RANIVILLE & S. R. SIKES.
Fly-Nets for Horses.

No. 214,190. Patented April 8, 1879.

Witnesses
C. VanCleve Granson.
Lillie G. Taggart.

Joint Inventors.
Felix Raniville
Simeon R. Sikes.
by Clark H. Gleason
Atty.

UNITED STATES PATENT OFFICE.

FELIX RANIVILLE AND SIMEON R. SIKES, OF GRAND RAPIDS, MICHIGAN.

IMPROVEMENT IN FLY-NETS FOR HORSES.

Specification forming part of Letters Patent No. 214,190, dated April 8, 1879; application filed February 3, 1879.

*To all whom it may concern:*

Be it known that we, FELIX RANIVILLE and SIMEON R. SIKES, of the city of Grand Rapids, in the county of Kent and State of Michigan, have jointly invented a new and useful Improvement in Leather Horse Fly-Nets, of which the following is a specification.

This invention relates to the manner of fastening the transverse cords or strips of leather to the longitudinal straps or bars of the net.

Figure 1:
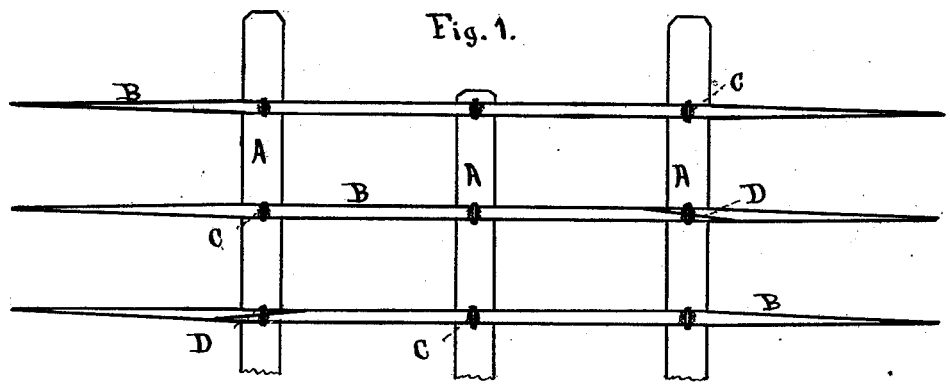

In the accompanying drawings, in which similar letters of reference indicate like parts, Figure 1 is a view of a portion of a net made in accordance with our invention.

A A represent the longitudinal straps. B B represent the transverse cords. C C represent the staples, which clasp the transverse cords B B and attach them to the longitudinal straps A A. D D show the splicing of the cords B B under the staples C C.

Figure 2:
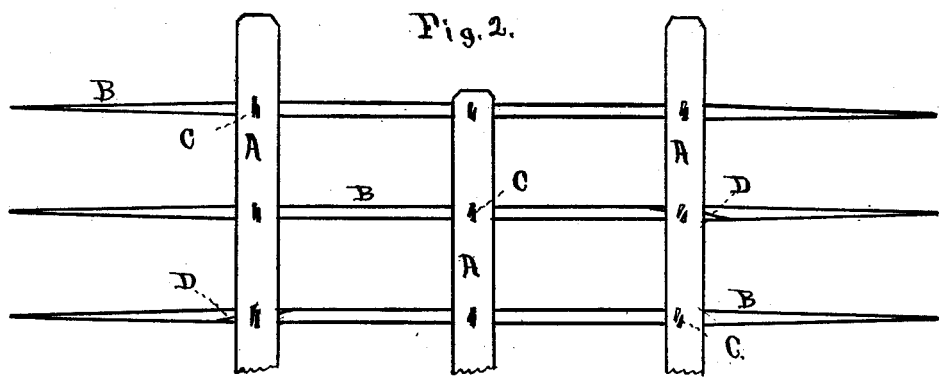
Figure 3:

Fig. 2 is a view of the under side of the net, showing the staples C C fastened by clinching. Fig. 3 shows the staple C.

Heretofore the transverse cords B B have been fastened to the longitudinal straps A A by making two holes in each strap for every cord sufficiently large to admit the cord, and passing the cord through the holes.

Our invention consists in fastening the transverse cords B B to the longitudinal straps A A with small wire staples C C, the staple to clasp the cord, then pass through the longitudinal strap and clinch on the under side D D, substantially as shown in Figs. 1, 2, and 3.

The advantages of this invention over the old method are that the longitudinal straps may be made much narrower and lighter. The transverse cords need not be full length, but may be pieced or spliced under every staple, so that all pieces of cord eight to ten inches in length may be utilized; and the staples hold the cords and the net more firmly in the normal position.

What we claim is—

An improvement in the construction of fly-nets, consisting in securing the longitudinal straps and the transverse cords together by means of staples which embrace the cords, then pass through the strap, and are clinched upon the under side, substantially as set forth.

FELIX RANIVILLE.
SIMEON R. SIKES.

Witnesses:
BENJ. A. HARLAN,
HENRY B. WETZELL.